(12) United States Patent
Nakanishi

(10) Patent No.: US 10,921,966 B2
(45) Date of Patent: Feb. 16, 2021

(54) DIGITIZING DEVICE AND DIGITIZING METHOD

(71) Applicant: Sharp Kabushiki Kaisha, Sakai (JP)

(72) Inventor: Tohru Nakanishi, Sakai (JP)

(73) Assignee: SHARP KABUSHIKI KAISHA, Sakai (JP)

(*) Notice: Subject to any disclaimer, the term of this patent is extended or adjusted under 35 U.S.C. 154(b) by 122 days.

(21) Appl. No.: 16/269,482

(22) Filed: Feb. 6, 2019

(65) Prior Publication Data

US 2019/0250796 A1    Aug. 15, 2019

(30) Foreign Application Priority Data

Feb. 9, 2018   (JP) .............................. JP2018-022220

(51) Int. Cl.
| | |
|---|---|
| *G06K 9/00* | (2006.01) |
| *G06F 3/0484* | (2013.01) |
| *G06F 3/0481* | (2013.01) |
| *G06T 19/00* | (2011.01) |
| *G06K 9/32* | (2006.01) |
| *G06F 3/041* | (2006.01) |
| *G06K 9/46* | (2006.01) |

(52) U.S. Cl.
CPC ........ *G06F 3/04842* (2013.01); *G06F 3/0416* (2013.01); *G06F 3/04815* (2013.01); *G06F 3/04845* (2013.01); *G06K 9/00201* (2013.01); *G06K 9/3241* (2013.01); *G06K 9/4604* (2013.01); *G06T 19/003* (2013.01)

(58) Field of Classification Search
None
See application file for complete search history.

(56) References Cited

U.S. PATENT DOCUMENTS

| | | | | |
|---|---|---|---|---|
| 5,139,338 | A | * | 8/1992 | Pomerantz ............. G01B 11/24 356/36 |
| 2014/0172377 | A1 | * | 6/2014 | Taubin .................... G06T 17/00 703/1 |
| 2018/0322372 | A1 | * | 11/2018 | Nakanishi ................ G06K 9/72 |
| 2019/0391089 | A1 | * | 12/2019 | Nakanishi .............. G01N 23/04 |

FOREIGN PATENT DOCUMENTS

| | | | | |
|---|---|---|---|---|
| EP | 0785674 | A1 * | 7/1997 | ............. H04N 5/325 |
| WO | WO-2017057492 | A1 * | 4/2017 | ....... H04N 5/232122 |
| WO | 2017/131184 | A1 | 8/2017 | |

OTHER PUBLICATIONS

Digital Restoration Using Volumetric Scanning. Seales (Year: 2004).*

* cited by examiner

*Primary Examiner* — Delomia L Gilliard
(74) *Attorney, Agent, or Firm* — ScienBiziP, P.C.

(57) ABSTRACT

A digitizing device that digitizes by imaging a solid object generates three-dimensional data of the solid object by overlying second imaged data onto first imaged data on a basis of at least one node disposed inside a partial region in the first imaged data and at least one node included in the second imaged data.

9 Claims, 4 Drawing Sheets

DIGITIZING DEVICE AND DIGITIZING METHOD

BACKGROUND

1. Field

The present disclosure relates to a digitizing device and a digitizing method.

2. Description of the Related Art

From the perspective of preserving and utilizing written material, there is demand for a process of converting written material into electronic data (also referred to as digitizing). Since written materials may be damaged when opened, there is demand for a process of converting written material into electronic data that is executable without opening the written material. Among such technologies for converting written materials into electronic data, there is a technology that specifies a page region corresponding to a page in written material from three-dimensional (3D) data of the written material acquired by X-ray scanning, and maps character strings or figures in the page region onto a two-dimensional (2D) plane (for example, see International Publication No. 2017/131184 (published Aug. 3, 2017)). According to such technology, 2D page data including character strings or figures written in the written material is created.

In the technology of the related art, the entirety of a piece of written material is digitized uniformly at the same resolution. For this reason, in the case of attempting to acquire high-resolution 3D data with the technology of the related art, there is a problem in that the process of digitizing written material becomes highly time-consuming.

Consequently, it is desirable to digitize a solid object more quickly.

SUMMARY

According to an aspect of the disclosure, there is provided a digitizing device that digitizes by imaging a solid object, including: an imaging unit that images at least a part of the solid object with energy rays to thereby generate first imaged data including multiple first points having a value corresponding to a material in the solid object and also arranged at a first resolution, decides a partial region in the first imaged data, and uses the energy rays to image only a location corresponding to the region in the solid object to thereby generate second imaged data including multiple second points having a value corresponding to a material in the solid object and also arranged at a second resolution higher than the first resolution; and a generation unit that generates three-dimensional data of the solid object by overlaying the second imaged data onto the first imaged data on a basis of at least one of the first points disposed inside the region in the first imaged data and at least one of the second points included in the second imaged data.

According to another aspect of the disclosure, there is provided a digitizing method that digitizes by imaging a solid object, including: imaging at least a part of the solid object with energy rays to thereby generate first imaged data including multiple first points having a value corresponding to a material in the solid object and also arranged at a first resolution; deciding a partial region in the first imaged data; using the energy rays to image only a location corresponding to the region in the solid object to thereby generate second imaged data including multiple second points having a value corresponding to a material in the solid object and also arranged at a second resolution higher than the first resolution; and generating three-dimensional data of the solid object by overlaying the second imaged data onto the first imaged data on a basis of at least one of the first points disposed inside the region in the first imaged data and at least one of the second points included in the second imaged data.

DESCRIPTION OF THE EMBODIMENTS

Embodiment 1

(Configuration of Digitizing Device 1)

Figure 1:
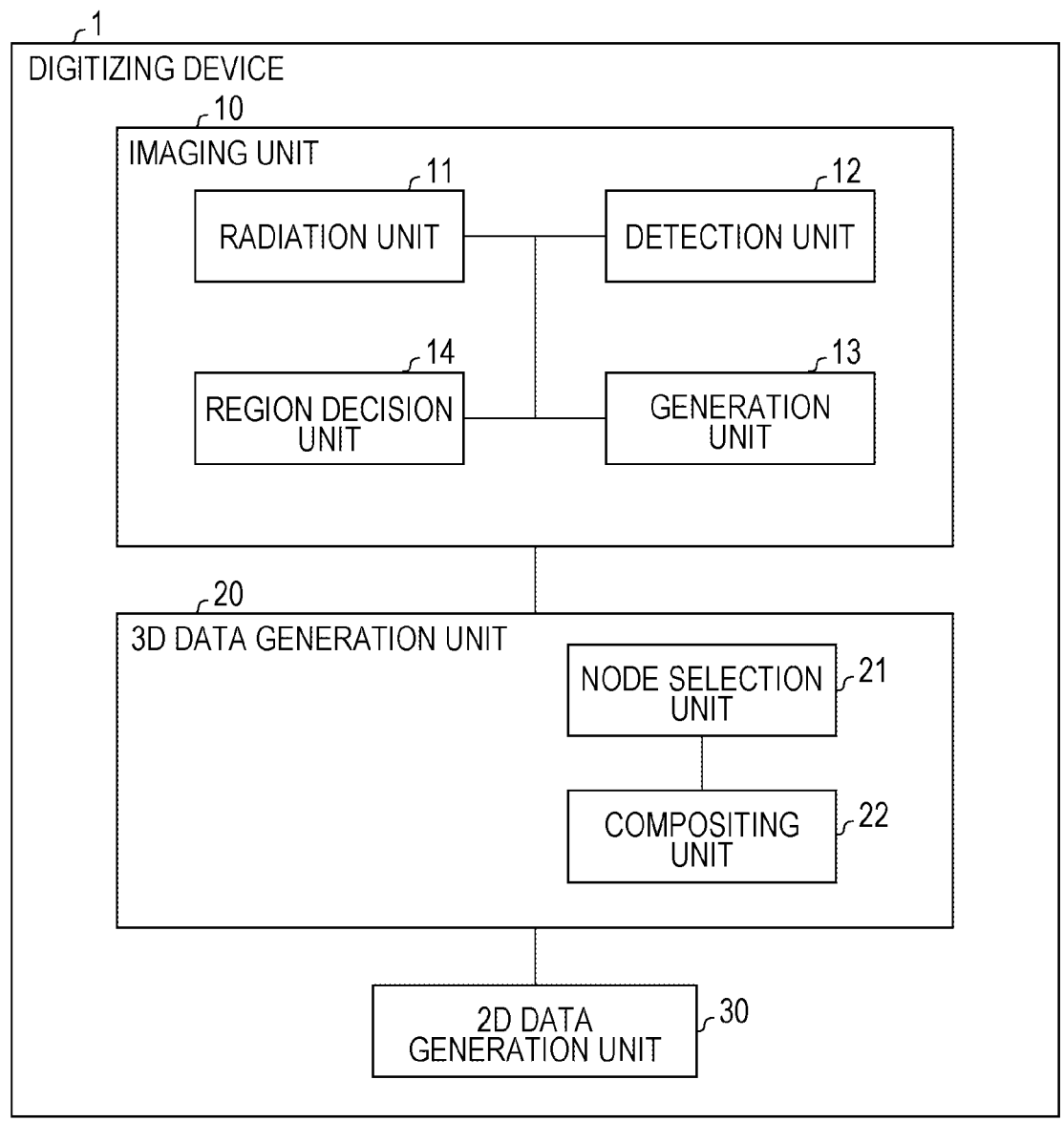
FIG. 1 is a block diagram illustrating a principal configuration of the digitizing device according to Embodiment 1.

FIG. 1 is a block diagram illustrating a principal configuration of the digitizing device 1 according to Embodiment 1. As illustrated in the drawing, the digitizing device 1 is provided with an imaging unit 10, a 3D data generation unit 20, and a 2D data generation unit 30. The imaging unit 10 is provided with a radiation unit 11, a detection unit 12, a generation unit 13, and a region decision unit 14. The 3D data generation unit 20 is provided with a node selection unit 21 and a compositing unit 22.

The digitizing device 1 is a device that images a solid object to thereby digitize information contained in the solid object. Digitizing refers to converting analog information into digital values. The solid object is any object having a three-dimensional structure, and is a piece of written material, a human body, or the like, for example. The written material may be a scroll in which a single sheet is rolled up, a book in which multiple sheets are bound together, or a stack of multiple unbound sheets. The sheets of the written material are typically but not limited to paper, and may also be plastic or the like. The imaging unit 10 images at least a part of the solid object with energy rays, and thereby generates imaged data including multiple nodes described later. The imaging unit 10 generates two sets of imaged data at different resolutions. The 3D data generation unit 20 generates 3D data of the solid object by compositing the two sets of imaged data generated by the imaging unit 10. The 2D data generation unit 30 generates 2D data of the solid object on the basis of the 3D data.

(Example of Imaged Data)

Figure 2A:
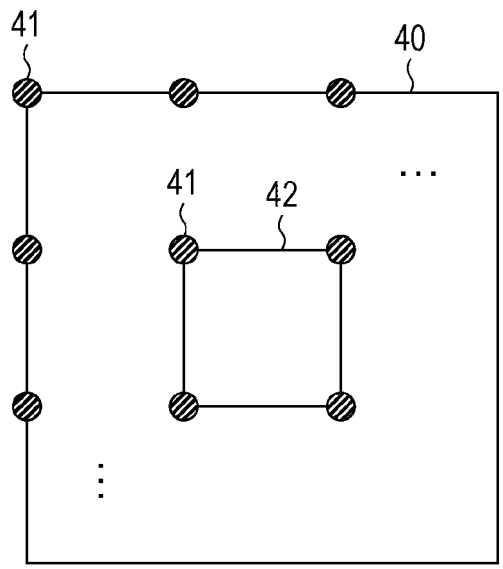
FIGS. 2A and 2B are diagrams illustrating one example of imaged data of a solid object and imaged data.
Figure 2B:
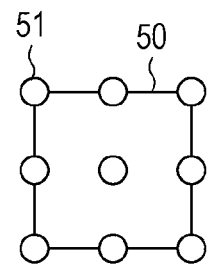

FIGS. 2A and 2B are diagrams illustrating one example of imaged data 40 of a solid object and imaged data 50. FIG. 2A illustrates one example of the imaged data 40, while FIG. 2B illustrates one example of the imaged data 50.

The radiation unit 11 irradiates an imaging range of the solid object with energy rays for imaging the solid object. The imaging range may be all or part of the solid object. The energy rays are any type of electromagnetic waves capable of passing through the solid object to be digitized, and are X-rays, visible light rays, ultraviolet rays, or infrared rays. The radiation unit 11 irradiates the solid object with a type of energy rays depending on the composition of the solid object. The user of the digitizing device 1 sets the digitizing device 1 to the type of energy rays to be radiated from the radiation unit 11 in advance according to the composition of the solid object to be digitized. For example, for a thick piece of written material written on paper, the radiation unit 11 radiates X-rays having excellent transmittance. For example, for thin sheaf of several sheets of paper, the radiation unit 11 radiates any energy rays other than X-rays. X-rays are preferable as the energy rays because a greater variety of solid objects may be digitized reliably. In the case in which the energy rays are X-rays, the imaging unit 10 is a phase-contrast X-ray tomographic imaging device, for example.

The detection unit 12 detects energy rays that have irradiated the solid object and also have been transmitted through the solid object. For example, the detection unit 12 is an energy ray sensor including multiple detection elements arranged in a planar array. In the case in which the energy rays are X-rays for example, a sensor provided with multiple X-ray detection elements is adopted as the detection unit 12.

(Generation of Imaged Data 40)

The generation unit 13 generates the imaged data 40 (first imaged data) illustrated in FIG. 2A by converting the detection data obtained by the detection unit 12. The imaged data 40 includes multiple nodes 41 (first points) arranged at a first resolution in the imaged data 40. Each node 41 has coordinate values and a data value. The coordinate values include an x-value, a y-value, and a z-value expressing the coordinates of the position corresponding to the node 41 in the solid object. The x-value expresses the position in the horizontal direction (x direction) of the node 41 in the solid object. The y-value expresses the position in the vertical direction (y direction) of the node 41 in the solid object. The z-value expresses the position in the depth direction (z direction) of the node 41 in the solid object. In the case in which an arbitrary position in the solid object is set as an origin, the x-value, y-value, and z-value correspond to each of the positions in the x direction, the y direction, and the z direction with respect to the origin. The data value is a value that corresponds to the position corresponding to the node 41 in the solid object. In the case in which the solid object is written material for example, the substance is any of paper, ink, and air. Each node 41 of the imaged data 40 has a data value in a range from 0 to 10. In the case in which the solid object is written material, for example, a data value from 6 to 9 corresponds to ink, a data value from 3 to 6 corresponds to paper, and a data value from 0 to 3 corresponds to the gap (air) between sheets of paper.

(Deciding Partial Region 42)

The region decision unit 14 decides a partial region 42 on the basis of user input into the digitizing device 1, for example. In this case, the digitizing device 1 displays the generated imaged data 40 on a screen. The user enters input for specifying the partial region 42 into the digitizing device 1 while looking at the displayed image of the imaged data 40. Typically, the user specifies as the partial region 42 a location where digitization at a second resolution higher than the first resolution is desired from among the entirety of the imaged data 40. In other words, the location corresponding to the partial region 42 in the solid object is a location that is of greater importance to the user. In the case in which the solid object is written material for example, the partial region 42 is the printed part of the written material that the user wants to read, while the remaining region is the margin (non-printed part) that does not include information that is meaningful to the user.

The region decision unit 14 is also able to decide the partial region 42 automatically on the basis of the imaged data 40 itself rather than user input. For example, the region decision unit 14 first roughly grasps the type and genre of the solid object by analyzing the generated imaged data 40. For example, the region decision unit 14 is able to grasp that the type of the solid object is written material, and the genre is comics. The region decision unit 14 automatically decides the partial region 42 included in the imaged data 40 on the basis of the grasped type and genre. For example, in the case in which the genre is comics, the region decision unit 14 decides as the partial region 42 a location where empirically characters are drawn often on a page of comics.

The imaging unit 10 may also repeatedly image the solid object while gradually raising the resolution until the partial region 42 may be decided automatically. For example, the imaging unit 10 generates imaged data by imaging the solid object at the lowest available resolution in the digitizing device 1. Next, the region decision unit 14 attempts to decide the partial region 42 from the generated imaged data. In the case in which the region decision unit 14 is unable to decide the partial region 42, the imaging unit 10 generates imaged data by imaging the solid object at a resolution a fixed value higher than the resolution of the previous imaging. The imaging unit 10 repeatedly images the solid object while gradually raising the resolution until the partial region 42 is decided successfully. The imaging unit 10 treats the resolution of the imaged data for which the partial region 42 is decided successfully as the first resolution described above.

One or multiple imaging units 10 may also be provided in the digitizing device 1. In the case in which the digitizing device 1 is provided with two imaging units 10 for example, one imaging unit 10 may generate imaged data at the first resolution while the other imaging unit 10 may generate imaged data at the second resolution.

(Generation of Imaged Data 50)

The imaging unit 10 uses energy rays to image only the location corresponding to the partial region 42 in the solid object, and thereby generates imaged data 50 (second resolution data) at the second resolution that is higher than the first resolution of the imaged data 40. For example, the detection unit 12 reports the size and position of the decided partial region 42 to the radiation unit 11. The radiation unit 11 irradiates with energy rays only the location corresponding to the partial region 42 in the solid object, on the basis of the reported size and position. The detection unit 12 detects the energy rays transmitted through only the location corresponding to the partial region 42 in the solid object. At this time, the detection unit 12 detects the energy rays at a detection resolution that matches the second resolution. With this arrangement, detection data at a higher detection resolution is obtained. By converting the obtained detection data, the generation unit 13 generates imaged data 50 including multiple nodes 51 (second points) arranged at the second resolution.

Each node 51 has coordinate values and a data value. The coordinate values include an x-value, a y-value, and a z-value expressing the coordinates of the position corresponding to the node 51 in the solid object. The x-value expresses the position in the horizontal direction (x direction) of the node 51 in the solid object. The y-value expresses the position in the vertical direction (y direction) of the node 51 in the solid object. The z-value expresses the position in the depth direction (z direction) of the node 51 in the solid object. With an arbitrary position in the solid object set as an origin, the x-value, y-value, and z-value correspond to each of the distances in the x direction, the y direction, and the z direction from the origin. The data value is a value that corresponds to the position corresponding to the node 51 in the solid object. In the case in which the solid object is written material for example, the substance is any of paper, ink, and air. Each node 51 of the imaged data 50 has a data value in a range from 0 to 10. In the case in which the solid object is written material, a data value from 6 to 9 corresponds to ink, a data value from 3 to 6 corresponds to paper, and a data value from 0 to 3 corresponds to the gap (air) between sheets of paper.

In FIG. 2B, the size of the partial region 42 and the size of the imaged data 50 match. On the other hand, the number and density of the nodes 51 included in the imaged data 50 are greater than the number and density of nodes 41 included in the imaged data 40. Consequently, the resolution of the imaged data 50 is higher than the resolution of the imaged data 40.

(Choosing Nodes)

The node selection unit 21 chooses one of the nodes 41 arranged in the partial region 42 in the imaged data 40. The node selection unit 21 additionally chooses one of the nodes 51 included in the imaged data 50. The compositing unit 22 overlays the imaged data 50 onto the imaged data 40 on the basis of the nodes 41 and the nodes 51 selected by the node selection unit 21. With this arrangement, the compositing unit 22 generates 3D data of the solid object.

(Generation of 3D Data)

Figure 3:
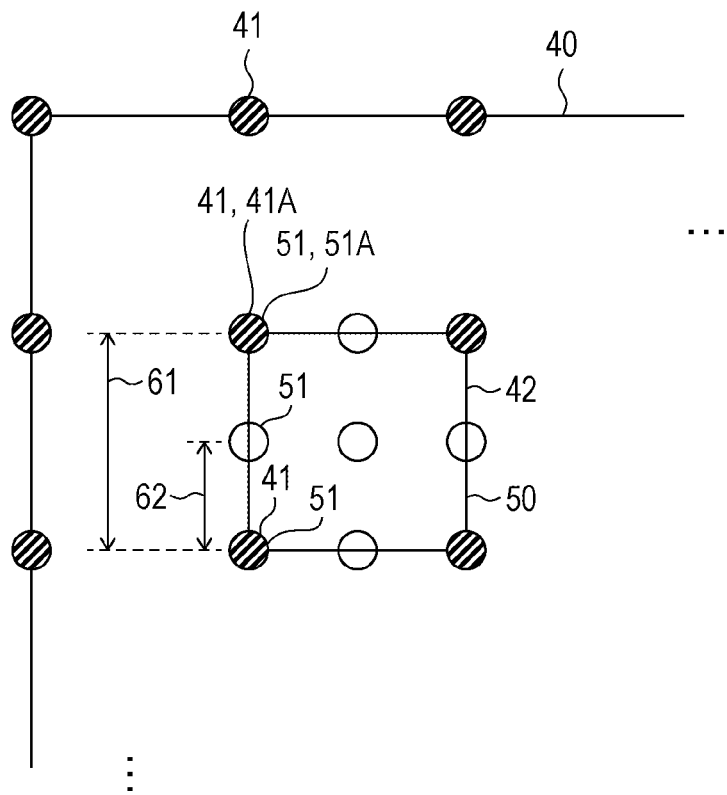
FIG. 3 is a diagram explaining the generation of 3D data according to Embodiment 1.

FIG. 3 is a diagram explaining the generation of 3D data according to Embodiment 1. In the example of FIG. 3, the generation unit 13 generates the imaged data 40 of the first resolution including multiple nodes 41 arranged at an arrangement spacing 61. Additionally, the generation unit 13 generates the imaged data 50 of the second resolution in which the nodes 51 are arranged at an arrangement spacing 62 that is an integer fraction of the arrangement spacing 61. In the example of FIG. 3, the arrangement spacing 62 is ½ the arrangement spacing 61. However, the arrangement spacing 62 is not limited to the above, and sufficiently is any integer fraction, such as ⅓ or ¼, of the arrangement spacing 61.

In FIG. 3, the arrangement spacing 62 is ½ the arrangement spacing 61. Consequently, the positions of some of the nodes 51 among all of the nodes 51 included in the imaged data 50 match the positions of some of the nodes 41 arranged in the partial region 42. In FIG. 3, for example, the node 51A disposed at the upper-left corner of the imaged data 50 matches the node 41A disposed at the upper-left corner of the imaged data 40.

The compositing unit 22 associates the node 41A disposed inside the partial region 42 in the imaged data 40 with the node 51A included in the imaged data 50 and also disposed at the same position as the node 41. Additionally, the compositing unit 22 may also associate other nodes 41 and other nodes 51 at the same positions with each other. For example, the compositing unit 22 is able to associate the node 41 disposed at the lower-left corner of the partial region 42 in the imaged data 40 with the node 51 disposed at the lower-left corner of the imaged data 50. It is sufficient for there to be at least one node 41 and one node 51 associated by the compositing unit 22.

The compositing unit 22 generates 3D data by associating the node 41A and the node 51A at the same position. In the generated 3D data, the node 51A disposed at the upper-left corner of the imaged data 50 is associated with the node 41A disposed at the upper-left corner of the partial region 42. Consequently, the digitizing device 1 is able to treat the 3D data as a single continuous piece of imaged data obtained by compositing the lower-resolution imaged data 40 and the higher-resolution imaged data 50.

In the overall 3D data, the range occupied by the imaged data 40 of the lower first resolution is larger than the range occupied by the imaged data 50 of the second resolution higher than the first resolution. Consequently, compared to the case of generating imaged data by imaging the entire imaging range in the solid object at the second resolution, the time taken to image the solid object may be decreased. With this arrangement, the digitizing device 1 is able to digitize a solid object more quickly.

In the 3D data, the position of the partial region 42 and the position of the imaged data 50 match. Consequently, in the case of displaying the 3D data for example, for the locations other than the partial region 42 in the 3D data, the digitizing device 1 displays on a screen each of the nodes 41 included in the imaged data 40. On the other hand, for the partial region 42 in the 3D data, the digitizing device 1 displays on the screen each of the nodes 51 included in the imaged data 50 superimposed over the partial region 42. With this arrangement, an image that is of low resolution overall but in which only the partial region 42 is high resolution is displayed on the screen. With this arrangement, the user is able to view an image in which locations of importance in the solid object are displayed more clearly.

The 2D data generation unit 30 generates 2D data of the solid object on the basis of the 3D data of the solid object generated by the 3D data generation unit 20. In the case in which the solid object is written material, the 3D data generation unit 20 is able to generate 2D data from 3D data by executing the written material digitizing method disclosed in International Publication No. 2017/131184 (published Aug. 3, 2017) described above, for example. Since details about the written material digitizing method are disclosed in International Publication No. 2017/131184 (published Aug. 3, 2017), a detailed description will not be repeated here. The 2D data generation unit 30 is able to generate page data including information such as characters or figures written (drawn) on the pages of the written material from the 3D data of the written material.

Embodiment 2

Figure 4:
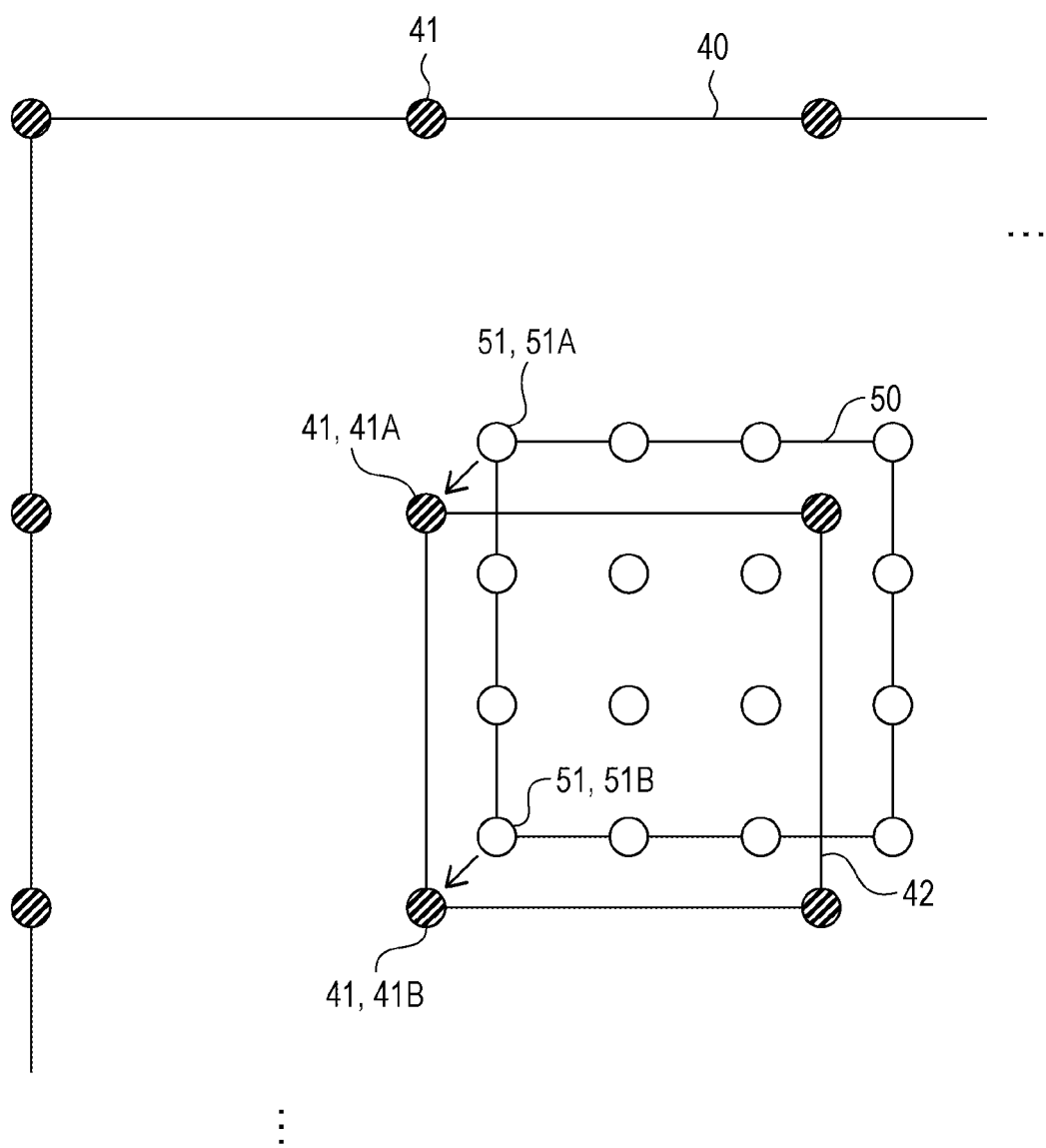
FIG. 4 is a diagram explaining the generation of 3D data according to Embodiment 2.

FIG. 4 is a diagram explaining the generation of 3D data according to Embodiment 2. The configuration of the digitizing device 1 according to Embodiment 2 is the same as the configuration of the digitizing device 1 according to Embodiment 1. In FIG. 4, because of some factor during the imaging at the second resolution, the positions of each of the nodes 51 included in the imaged data 50 have been shifted from the original correct positions. This has caused the position of the imaged data 50 to become shifted from the position of the partial region 42 in the imaged data 40. As a result, the positions of each of the nodes 41 included in the partial region 42 do not match any of the positions of the multiple nodes 51 included in the imaged data 50.

Accordingly, unlike Embodiment 1, the node selection unit 21 chooses one of the nodes 41 arranged inside the partial region 42 in the imaged data 40 and a node 51 included in the imaged data 50 and also arranged at a different position from the node 41. The compositing unit 22 overlays the imaged data 50 onto the imaged data 40 by moving the chosen nodes 51 to the chosen nodes 41 in the imaged data 40.

(Moving Nodes 51)

In FIG. 4, the node selection unit 21 chooses the node 41A disposed at the upper-left corner of the partial region 42 from among the multiple nodes 41 included in the partial region 42. Additionally, the node selection unit 21 chooses the node 51A disposed at the position closest to the node 41A from among the multiple nodes 51 included in the imaged data 50. The node 51A is disposed at the upper-left corner in the imaged data 50. The compositing unit 22 moves the node 51A to the node 41A in the imaged data 40. More specifically, the compositing unit 22 removes the node 41A from the imaged data 40, moves the node 51A to the position of the node 41A in the imaged data 40, and additionally removes the node 51A from the imaged data 50.

Additionally, the node selection unit 21 chooses a node 41B disposed at the lower-left corner of the partial region 42 from among the multiple nodes 41 included in the partial region 42. Additionally, the node selection unit 21 chooses the node 51B disposed at the position closest to the node 41B from among the multiple nodes 51 included in the imaged data 50. The node 51B is disposed at the lower-left corner in the imaged data 50. The compositing unit 22 moves the node 51B to the node 41B in the imaged data 40. More specifically, the compositing unit 22 removes the node 41B from the imaged data 40, moves the node 51B to the position of the node 41B in the imaged data 40, and additionally removes the node 51B from the imaged data 50.

The compositing unit 22 aligns the imaged data 50 to the partial region 42 by moving the node 51A and the node 51B. As a result, the digitizing device 1 is able to treat the 3D data as a single continuous piece of imaged data obtained by compositing the lower-resolution imaged data 40 and the higher-resolution imaged data 50. Also, only the imaged data 50 among the entirety of the 3D data is the higher second resolution data. Consequently, compared to the case of generating 3D data of a solid object by imaging the entire imaging range of the solid object at the second resolution, the digitizing device 1 is able to generate 3D data of the solid object more quickly.

Embodiment 3

Figure 5:
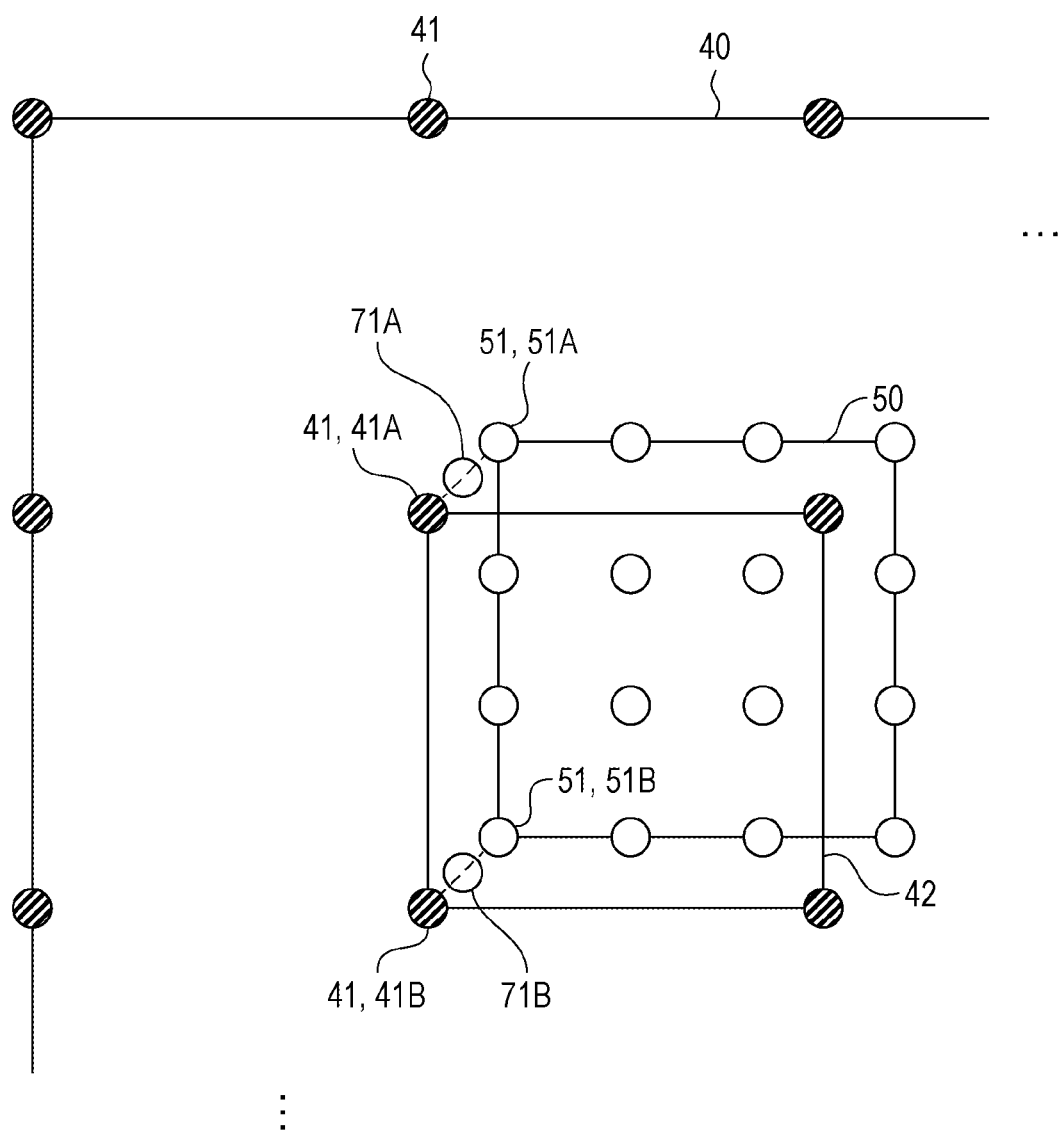
FIG. 5 is a diagram explaining the generation of 3D data according to Embodiment 3.

FIG. 5 is a diagram explaining the generation of 3D data according to Embodiment 3. The configuration of the digitizing device 1 according to Embodiment 3 is the same as the configuration of the digitizing device 1 according to Embodiment 1. In FIG. 5, similarly to FIG. 4, because of some factor during the imaging at the second resolution, the positions of each of the nodes 51 included in the imaged data 50 have been shifted from the original correct positions. This has caused the position of the imaged data 50 to become shifted from the position of the partial region 42 in the imaged data 40. As a result, the positions of each of the nodes 41 included in the partial region 42 do not match any of the positions of the multiple nodes 51 included in the imaged data 50.

In Embodiment 3, the node selection unit 21 chooses one of the nodes 41 arranged inside the partial region 42 in the imaged data 40 and a node 51 included in the imaged data 50 and also arranged at a different position from the node 41. This point is the same as Embodiment 2. In Embodiment 3, the compositing unit 22 does not move the chosen nodes 51 to the positions of the chosen nodes 41. Instead, the compositing unit 22 generates new nodes disposed between the chosen nodes 41 and the chosen nodes 51. Additionally, the compositing unit 22 adds the generated new nodes to the imaged data 40.

(Adding Nodes)

In FIG. 5, the node selection unit 21 chooses the node 41A disposed at the upper-left corner of the partial region 42 from among the multiple nodes 41 included in the partial region 42. Additionally, the node selection unit 21 chooses the node 51A disposed at the position closest to the node 41A from among the multiple nodes 51 included in the imaged data 50. The node 51A is disposed at the upper-left corner in the imaged data 50. The compositing unit 22 chooses a position on a line joining the node 41A and the node 51B as the position at which to dispose a new node 71A. In FIG. 5, the midpoint of the line is the position at which to dispose the node 71A. The compositing unit 22 generates the node 71A and also adds the node 71A at the chosen arrangement position in the imaged data 40. With this arrangement, since the new node 71A is added at a location that does not overlap with the imaged data 50 in the partial region 42, the seam between the imaged data 40 and the imaged data 50 may be brought closer to a natural state.

(Deciding Data Value)

When generating the node 71A, the compositing unit 22 decides the data value of the node 71A on the basis of the data value of the node 41A and the data value of the node 51A. With this arrangement, it is possible to keep the data value of the node 71A from being greatly different from the data value of the node 41A or the data value of the node 51A. For example, the compositing unit 22 decides the average of the data value of the node 41A and the data value of the node 51A as the data value of the node 71A. With this arrangement, the data value of the node 71A disposed between the node 41A and the node 51A becomes closer to both the data value of the node 41A and the data value of the node 51A. Consequently, the node 41A, the node 71A, and the node 51A disposed in succession to each other may be arranged more naturally.

By associating the node 41A, the node 51A, and the node 71A with each other, the compositing unit 22 overlays the imaged data 50 onto the imaged data 40. The imaged data 50 is aligned to the partial region 42. As a result, the digitizing device 1 is able to treat the 3D data as a single continuous piece of imaged data obtained by compositing the lower-resolution imaged data 40 and the higher-resolution imaged data 50. Also, only the imaged data 50 among the entirety of the 3D data is the higher second resolution data. Consequently, compared to the case of generating 3D data of a solid object by imaging the entire imaging range of the solid object at the second resolution, the digitizing device 1 is able to generate 3D data of the solid object more quickly.

In FIG. 5, the compositing unit 22 is also able generate a new node 71B between the node 41B disposed at the lower-left corner of the partial region 42 and the node 51B disposed at the lower-left corner of the imaged data 50. The node 51B is the node 51 closest to the node 41B from among the multiple nodes 51 included in the imaged data 50. The compositing unit 22 adds the generated node 71B at an intermediate position between the node 41B and the node 51B in the imaged data 40. By adding the node 71B in addition to the node 71A to the imaged data 40, the number of nodes 71 disposed at locations that do not overlap with the imaged data 50 in the partial region 42 may be increased further. Consequently, the seam between the imaged data 40 and the imaged data 50 may be brought closer to an even more natural state.

[Example of Implementation by Software]

The control block of the digitizing device 1 may be implemented by logic circuits (hardware) formed in an integrated circuit (IC chip) or the like, but may also be implemented by software.

In the latter case, the digitizing device 1 is provided with a computer that executes the commands of a program acting as the software that implements each function. The computer is provided with at least one processor (control device) for example and also with at least one computer-readable recording medium storing the program. Additionally, by having the processor read out the program from the recording medium and execute the program on the computer, the above functions are realized.

For the processor, a central processing unit (CPU) may be used, for example. For the recording medium, a "non-transitory tangible medium" such as read-only memory (ROM) but also including a tape, a disk, a card, semiconductor memory, a programmable logic circuit, or the like may be used, for example. Also, random access memory (RAM) or the like into which the program is loaded additionally may be provided.

In addition, the program may also be supplied to the computer via any transmission medium (such as a communication network or a broadcast wave) capable of transmitting the program.

Note that an aspect of the present disclosure may also be realized in the form of a data signal in which the above program code is embodied by electronic transmission, and embedded in a carrier wave.

CONCLUSION

The digitizing device 1 according to Aspect 1 of the present disclosure is a digitizing device 1 that digitizes by imaging a solid object, and is provided with: an imaging unit 10 that images at least a part of the solid object with energy rays to thereby generate imaged data 40 including multiple nodes 41 having a value corresponding to a material in the solid object and also arranged at a first resolution, decides a partial region 42 in the imaged data 40, and uses the energy rays to image only a location corresponding to the partial region 42 in the solid object to thereby generate imaged data 50 including multiple nodes 51 having a value corresponding to a material in the solid object and also arranged at a second resolution higher than the first resolution; and a 3D data generation unit 20 that generates 3D data of the solid object by overlaying the imaged data 50 onto the imaged data 40 on a basis of at least one of the nodes 41 disposed inside the partial region 42 in the imaged data 40 and at least one of the nodes 51 included in the imaged data 50.

According to this configuration, it is possible to digitize a solid object quickly.

According to the digitizing device 1 according to Aspect 2 of the present disclosure, in Aspect 1, the imaging unit 10 may generate the imaged data 50 in which the nodes 51 are arranged at an arrangement spacing 62 that is an integer fraction of an arrangement spacing 61 of the nodes 41 in the imaged data 40, and the 3D data generation unit 20 may associate at least one of the nodes 41 disposed inside the partial region 42 in the imaged data 40 with at least one of the nodes 51 included in the imaged data 50 and also disposed at a same position as the at least one node 41.

According to this configuration, the 3D data may be treated as a single continuous piece of imaged data obtained by compositing the imaged data 40 and the imaged data 50.

According to the digitizing device 1 according to Aspect 3 of the present disclosure, in Aspect 1, the 3D data generation unit 20 may choose at least one of the nodes 41 disposed inside the partial region 42 in the imaged data 40 and at least one of the nodes 51 included in the imaged data 50 and also disposed at a different position than the at least one node 41, and in the imaged data 40, move the at least one chosen node 51 to the at least one chosen node 41.

According to this configuration, the 3D data may be treated as a single continuous piece of imaged data obtained by compositing the imaged data 40 and the imaged data 50.

According to the digitizing device 1 according to Aspect 4 of the present disclosure, in Aspect 1, the 3D data generation unit 20 may choose at least one node 41A disposed inside the partial region 42 in the imaged data 40 and at least one node 51A included in the imaged data 50 and also disposed at a different position than the at least one node 41A, generate at least one new point disposed between the at least one chosen node 41A and the at least one chosen node 51A, and add the at least one generated new node 71A to the imaged data 40.

According to this configuration, the seam between the imaged data 40 and the imaged data 50 may be brought closer to a natural state.

According to the digitizing device 1 according to Aspect 5 of the present disclosure, in Aspect 4, the 3D data generation unit 20 may decide a value of the at least one new node 71A on a basis of a value of the at least one chosen node 41A and a value of the at least one chosen node 51A.

According to this configuration, the node 41A, the node 71A, and the node 51A disposed in succession to each other may be arranged more naturally.

According to the digitizing device 1 according to Aspect 6 of the present disclosure, in any of Aspects 3 to 5, the 3D data generation unit 20 may choose at least one of the nodes 41 disposed inside the partial region 42 in the imaged data 40 and at least one of the nodes 51 included in the imaged data 50 and also disposed at a position closest to the at least one node 41.

According to this configuration, the 3D data may be treated as a single continuous piece of imaged data obtained by compositing the imaged data 40 and the imaged data 50.

According to the digitizing device 1 according to Aspect 7 of the present disclosure, in any of Aspects 1 to 6, the imaging unit 10 may automatically decide the partial region 42 on a basis of the imaged data 40.

According to this configuration, a user does not have to specify the partial region 42.

According to the digitizing device 1 according to Aspect 8 of the present disclosure, in any of Aspects 1 to 7, the energy rays may be X-rays.

According to this configuration, it is possible to digitize typical written materials that use paper as a medium.

According to the digitizing device 1 according to Aspect 9 of the present disclosure, in any of Aspects 1 to 8, the solid object may be a piece of written material.

According to this configuration, it is possible to digitize typical written materials that use paper as a medium.

According to the digitizing device 1 according to Aspect 10 of the present disclosure, in any of Aspects 1 to 9, the digitizing device 1 additionally may be provided with: a 2D data generation unit 30 that generates 2D data of the solid object on a basis of the 3D data.

According to this configuration, electronic data indicating the content of the solid object may be created.

The digitizing method according to Aspect 11 of the present disclosure is a digitizing method that digitizes by imaging a solid object, and includes: imaging at least a part of the solid object with energy rays to thereby generate imaged data 40 including multiple nodes 41 having a value corresponding to a material in the solid object and also arranged at a first resolution; deciding a partial region 42 in the imaged data 40; using the energy rays to image only a location corresponding to the partial region 42 in the solid object to thereby generate imaged data 50 including multiple nodes 51 having a value corresponding to a material in the solid object and also arranged at a second resolution higher than the first resolution; and generating 3D data of the solid object by overlaying the imaged data 50 onto the imaged data 40 on a basis of at least one of the nodes 41 disposed inside the partial region 42 in the imaged data 40 and at least one of the nodes 51 included in the imaged data 50.

According to this configuration, effects similar to Aspect 1 are exhibited.

The present disclosure is not limited to the each of the embodiments described above, and various modifications are possible within the scope indicated by the claims. Embodiments obtained by appropriately combining the technical means disclosed in each of different embodiments are also included in the technical scope of the present disclosure. New technical features may also be formed by combining the technical means disclosed in each of the embodiments.

The present disclosure contains subject matter related to that disclosed in Japanese Priority Patent Application JP 2018-022220 filed in the Japan Patent Office on Feb. 9, 2018, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A digitizing device that digitizes by imaging a solid object, the digitizing device comprising:
   imaging circuitry that images at least a part of the solid object with energy rays to thereby generate first imaged data including multiple first points having a value corresponding to a material in the solid object and also arranged at a first resolution, decides a partial region in the first imaged data, and uses the energy rays to image only a location corresponding to the region in the solid object to thereby generate second imaged data including multiple second points having a value corresponding to a material in the solid object and also arranged at a second resolution higher than the first resolution; and
   generation circuitry that generates three-dimensional data of the solid object by overlaying the second imaged data onto the first imaged data on a basis of at least one of the first points disposed inside the region in the first imaged data and at least one of the second points included in the second imaged data, wherein
   the imaging circuitry generates the second imaged data in which the second points are arranged at an arrangement spacing that is an integer fraction of an arrangement spacing of the first points in the first imaged data, and
   the generation circuitry associates at least one of the first points disposed inside the region in the first imaged data with at least one of the second points included in the second imaged data and also disposed at a same position as the at least one first point.

2. The digitizing device according to claim 1, wherein the imaging circuitry automatically decides the region on a basis of the first imaged data.

3. The digitizing device according to claim 1, wherein the energy rays are X-rays.

4. The digitizing device according to claim 1, wherein the solid object is a piece of written material.

5. The digitizing device according to claim 4, further comprising:
   two-dimensional data generation circuitry that generates two-dimensional data of the solid object on a basis of the three-dimensional data.

6. A digitizing device that digitizes by imaging a solid object, the digitizing device comprising:
   imaging circuitry that images at least a part of the solid object with energy rays to thereby generate first imaged data including multiple first points having a value corresponding to a material in the solid object and also arranged at a first resolution, decides a partial region in the first imaged data, and uses the energy rays to image only a location corresponding to the region in the solid object to thereby generate second imaged data including multiple second points having a value corresponding to a material in the solid object and also arranged at a second resolution higher than the first resolution; and
   generation circuitry that generates three-dimensional data of the solid object by overlaying the second imaged data onto the first imaged data on a basis of at least one of the first points disposed inside the region in the first imaged data and at least one of the second points included in the second imaged data, wherein
   the generation circuitry
      chooses at least one of the first points disposed inside the region in the first imaged data and at least one of the second points included in the second imaged data and also disposed at a different position than the at least one first point, and
      in the first imaged data, moves a position of the at least one chosen second point to a position of the at least one chosen first point.

7. The digitizing device according to claim 6, wherein the generation circuitry chooses at least one of the first points disposed inside the region in the first imaged data and at least one of the second points included in the second imaged data and also disposed at a position closest to the at least one first point.

8. A digitizing device that digitizes by imaging a solid object, the digitizing device comprising:
   imaging circuitry that images at least a part of the solid object with energy rays to thereby generate first imaged data including multiple first points having a value corresponding to a material in the solid object and also arranged at a first resolution, decides a partial region in the first imaged data, and uses the energy rays to image only a location corresponding to the region in the solid object to thereby generate second imaged data including multiple second points having a value corresponding to a material in the solid object and also arranged at a second resolution higher than the first resolution; and
   generation circuitry that generates three-dimensional data of the solid object by overlaying the second imaged data onto the first imaged data on a basis of at least one of the first points disposed inside the region in the first imaged data and at least one of the second points included in the second imaged data, wherein the generation circuitry
- chooses at least one of the first points disposed inside the region in the first imaged data and at least one of the second points included in the second imaged data and also disposed at a different position than the at least one first point,
- generates at least one new point disposed between the at least one chosen first point and the at least one chosen second point, and adds the at least one generated new point to the first imaged data.

9. The digitizing device according to claim 8, wherein
the generation circuitry decides a value of the at least one new point on a basis of a value of the at least one chosen first point and a value of the at least one chosen second point.

* * * * *